UNITED STATES PATENT OFFICE.

HENRY F. WILLIAMS, OF SAN FRANCISCO, CALIFORNIA.

COMPOSITION FOR PAVING, &c.

SPECIFICATION forming part of Letters Patent No. 661,362, dated November 6, 1900.

Application filed December 28, 1896. Serial No. 617,281. (No specimens.)

*To all whom it may concern:*

Be it known that I, HENRY F. WILLIAMS, a citizen of the United States, residing in the city and county of San Francisco, State of California, have discovered a new and useful Composition for Paving, Roofing, &c., of which the following is a description.

My discovery in its relation to compositions for these purposes is that in the working of an unallied art a waste product is produced in large quantities which for chemical and mechanical reasons hereinafter explained is not only of great value for tempering and giving the proper consistency to pure asphaltum, but accomplishes that result in a way which is relatively so inexpensive that the best paving and roofing composition can be produced at a greatly-reduced cost as compared with processes heretofore necessarily used.

It is well known in the art of making paving and roofing compounds that the mixing of pure asphaltum with pulverized limestone or carbonate of lime in proper proportions results in an exceedingly-tough and yet flexible compound for these purposes. The carbonic acid of the lime has a strong affinity for the hydrocarbon of the asphaltum, producing an intimate chemical mixture which resists the ordinary processes of disintegration as well as the mechanical wear to which a pavement is subjected. To obtain the best results, the limestone must be finely pulverized before mixing, and this entails the expense of mechanical crushing-machines and of the labor for operating them. To calcine the stone would do away with the crushing process and would reduce such stone to the required soft condition for a mechanical union with the asphaltum; but the calcining having driven off the carbonic acid of the stone the intimate chemical union is no longer possible and the stone has lost the quality which gave it its chief value. If it were possible to recharge the calcined limestone with carbonic acid and to do it cheaply, all the conditions favorable to its use in paving and roofing compositions would be present. The expense of such an additional process, however, makes its use commercially impracticable.

I have discovered that in the practice of the unallied art of refining crude beet-root syrup a waste product is produced in great quantities the accumulation of which is only a source of annoyance and trouble to the sugar-refiners, and yet this waste product, owing to the processes and treatments which have resulted in its formation, is mechanically and chemically exactly fitted for mixing with asphaltum and contains all the qualities which I have heretofore pointed out as so desirable for that purpose. It is, in fact, as I shall hereinafter explain, better adapted for tempering asphaltum than mechanically-pulverized limestone, since the processes which have produced it give it certain additional characteristics and qualities which are lacking in the pulverized stone. This product is, in fact, calcined limestone recharged with carbonic acid, which, as I have pointed out, would be a desirable material to use with asphaltum if it could be produced cheaply enough, and in this case it is evident that the cost of production can be ignored, since it is one of the operating expenses of beet-sugar refining and only an incident of that manufacturing process.

In refining and purifying crude beet-root syrup and removing the dark color the agent employed is milk of lime produced by calcining limestone and slaking the lime. This is mixed with the syrup and is afterward precipitated by carbonic acid, which is absorbed or taken up by the lime. A thick sludge or paste is thus formed which is subjected to heavy pressure, leaving as a residuum a carbonate in the form of solid lime cake or lime-sludge. This material possesses all the mechanical and chemical advantages of crushed and pulverized limestone for mixing with asphaltum, and if, in addition, it has taken from the syrup some small quantity of vegetable matter such matter is of advantage in mechanically binding together and strengthening the union of lime and asphaltum. I mix this product with melted asphaltum in proper proportions to produce a composition for the intended purpose. This composition of asphaltum and carbonate of lime prepared as stated may be mixed with sand, gravel, or other paving and roofing materials in proper proportions. In this way I have utilized and rendered of commercial value a waste product which up to this time has been a worthless accumulation in the beet-sugar works, and by utilizing it I have enabled the best quality of paving and roofing composition to be made at a cost which it has been hitherto impossible to reach.

I have throughout this specification admitted and impliedly disclaimed the broad use of pulverized limestone as an ingredient for tempering asphaltum. My discovery only extends to the adaptability of calcined limestone which has taken up carbonic acid to the particular waste product embodying that idea and to a logical demonstration of the reasons for such adaptability. So far as I am aware this has not heretofore been recognized or pointed out.

I am aware that it has been proposed to use refuse lime produced by the old wet process of making illuminating-gas in combination with coal-tar and with clay all in a consistency suitable for molding. Such a combination is not my invention, which is restricted to a combination of asphaltum with refuse lime produced in the manufacture of beet-sugar, as fully hereinbefore described.

Having described my discovery, what I claim, and desire to secure by Letters Patent, is—

A composition for the described purpose consisting of asphaltum, and lime-sludge from purification of beet-juice in sugar-manufacture, the same being calcined limestone which has taken up carbonic acid in the purifying process.

In testimony that I claim the foregoing I have hereunto set my hand and seal.

HENRY F. WILLIAMS. [L. S.]

Witnesses:
C. W. M. SMITH,
CHAS. E. KELLY.